(12) United States Patent
Jojic et al.

(10) Patent No.: US 11,091,273 B2
(45) Date of Patent: Aug. 17, 2021

(54) NONCOMBUSTIBLE GAS DISTRIBUTION METHODS AND SYSTEMS ON AIRCRAFT

(71) Applicant: The Boeing Company, Chicago, IL (US)

(72) Inventors: Ivana Jojic, Bellevue, WA (US); Alan Grim, Lake Stevens, WA (US); Bill F. Lin, Bothell, WA (US); Kristopher Vaughan, Seattle, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 16/655,393

(22) Filed: Oct. 17, 2019

(65) Prior Publication Data
US 2020/0047910 A1 Feb. 13, 2020

Related U.S. Application Data

(63) Continuation of application No. 15/374,332, filed on Dec. 9, 2016, now Pat. No. 10,479,521.

(51) Int. Cl.
*B64D 37/32* (2006.01)
*B64C 3/34* (2006.01)
(Continued)

(52) U.S. Cl.
CPC ............... *B64D 37/32* (2013.01); *A62C 3/08* (2013.01); *A62C 99/0018* (2013.01); *B64C 3/34* (2013.01); *B64D 37/00* (2013.01); *Y02T 50/40* (2013.01)

(58) Field of Classification Search
CPC .......... B64D 37/32; B64D 37/00; A62C 3/08; A62C 99/0018; B64C 3/34; Y02T 50/44
See application file for complete search history.

(56) References Cited

U.S. PATENT DOCUMENTS

| 6,741,019 B1 | 5/2004 | Filas et al. |
| 6,913,636 B2 | 7/2005 | Defrancesco et al. |

(Continued)

FOREIGN PATENT DOCUMENTS

EP 2813431 12/2014

OTHER PUBLICATIONS

William Cavage, Center Wing Fuel Tank Flammability Control, International Systems Fire Protection Working Group CAA House London, GBR Apr. 16, 2006.

(Continued)

*Primary Examiner* — Assres H Woldemaryam
(74) *Attorney, Agent, or Firm* — Parsons Behle & Latimer (57) ABSTRACT

A noncombustible gas distribution method includes distributing noncombustible gas to a center wing tank throughout a continuous, first flight period and, as a result, reducing flammability exposure time during the first flight period or during a subsequent flight period. The method includes not distributing noncombustible gas to left and right main wing tanks while the noncombustible gas is distributed to the center wing tank throughout the first flight period and while the left and right main wing tanks are non-flammable. A noncombustible gas distribution system includes a noncombustible gas source and distribution tubing from the gas source to left and right main wing tanks and a center wing tank. A distribution mechanism yields a greater proportion of gas flow per tank unit volume distributed to an outboard section of the left and right main wing tanks compared to an inboard section during a climb phase of the aircraft's flight.

19 Claims, 3 Drawing Sheets

(51) Int. Cl.
*B64D 37/00* (2006.01)
*A62C 99/00* (2010.01)
*A62C 3/08* (2006.01)

(56) References Cited

U.S. PATENT DOCUMENTS

| | | | |
|---|---|---|---|
| 7,007,893 | B2 | 3/2006 | Loss et al. |
| 7,081,153 | B2 | 7/2006 | Leigh et al. |
| 7,152,635 | B2 | 12/2006 | Moravec et al. |
| 7,191,983 | B2 | 3/2007 | Loss et al. |
| 7,204,868 | B2 | 4/2007 | Snow, Jr. |
| 7,442,230 | B2 | 10/2008 | Snow, Jr. |
| 8,147,592 | B2 | 4/2012 | Byrd et al. |
| 8,808,428 | B2 | 8/2014 | Gupta |
| 9,114,886 | B2 | 8/2015 | Gupta |
| 9,764,851 | B2 * | 9/2017 | Komoda ............. B64C 3/34 |
| 9,828,096 | B2 * | 11/2017 | Veto ................... B64C 9/02 |
| 2005/0115404 | A1 | 6/2005 | Leigh et al. |
| 2011/0068231 | A1 | 3/2011 | Surawski |
| 2012/0193479 | A1 * | 8/2012 | Roscoe ............. B64D 37/08 244/135 R |
| 2013/0048144 | A1 * | 2/2013 | Krug ................. B64D 37/32 141/4 |
| 2014/0130894 | A1 * | 5/2014 | Fukuda ............. B64D 37/32 137/154 |
| 2014/0201980 | A1 | 7/2014 | Beardslee et al. |
| 2014/0366950 | A1 * | 12/2014 | Haskins ............. B64D 37/04 137/13 |
| 2016/0009407 | A1 | 1/2016 | Fukuda |

OTHER PUBLICATIONS

Steve Summer, Wing Tank Flammability Testing and Modeling, Federal Aviation Administration Fire Safety Branch Apr. 17, 2007.
Federal Register, Part II Department of Transportation, Federal Aviation Administration; 14 CFR Part 25 Feb. 15, 2005.
European Patent Office; Extended European Search Report; European Patent Application No. 17170629.4 dated Jan. 5, 2018.
Lu Yuan et al: "The origin of hematite nanowire growth during the thermal oxidation of iron", Materials Science and Engineering Jan. 9, 2012.
Hui Zheng et al: "Synthesize of barium ferrite nanowire array by self-fabricated porous Silicon template", Applied Surface Science, Mar. 28, 2014.
European Patent Office; Extended European Search Report; European Patent Application No. 17198962.7; Jan. 15, 2018.
US Patent and Trademark Office; Office Action; U.S. Appl. No. 15/374,332; dated Jan. 11, 2019.
European Patent Office; Communication Pursuant to Article 94(3) EPC for European Patent Application No. 17198962.7; dated May 3, 2019.
US Patent and Trademark Office; Final Office Action; U.S. Appl. No. 15/374,332; dated Jun. 26, 2019.

* cited by examiner

NONCOMBUSTIBLE GAS DISTRIBUTION METHODS AND SYSTEMS ON AIRCRAFT

RELATED APPLICATIONS

The present application is a continuation patent application of U.S. patent application Ser. No. 15/374,332 entitled Noncombustible Gas Distribution Methods and Systems on Aircraft filed on Dec. 9, 2016, which is incorporated by referenced herein in its entirety.

BACKGROUND

The Federal Aviation Administration (FAA) reconsidered aircraft fuel tank safety after a series of fuel tank explosions between 1990 and 2001. The National Transport Safety Board (NTSB) added "Explosive Mixture in Fuel tanks in Transport Category Aircrafts" as the number one item in its 1997 "Most Wanted" Transportation Safety list. Some known fuel tanks have a region containing liquid fuel and an ullage region that often contains evaporated fuel (i.e., fuel vapor). With the presence of air, the mixture may exhibit a fuel-air ratio within the ullage and ignition may occur when fuel-air ratio in the ullage lies within a certain range. The lower flammability limit (LFL) is defined as the fuel temperature below which the fuel-air ratio is too lean to ignite. Similarly, the upper flammability limit (UFL) is defined as the fuel temperature above which the fuel-air ratio is too rich to ignite. The fuel-air ratios between the lower flammability limit and the upper flammability limit are flammable.

In the context of the present document, a fuel tank is flammable when fuel temperature is between the Lower and Upper Flammability Limits (LFL, UFL), and a fuel tank is inert when the tank oxygen is below the Inert Limit, as defined by the 14 Code of Federal Regulations § 25.981(b), Appendix N. LFL and UFL are a function of fuel flash point and altitude, while Inert Limit is a function of altitude. The flammability exposure is defined as the length time, or percentage of evaluation time, during which the tank is flammable. Nonflammable ullage exists when the fuel temperature is either outside the range between the LFL and UFL or tank oxygen is below the inert limit. "Inerting" refers to the process of reducing flammability exposure by introducing noncombustible gas into the ullage of a fuel tank so that the ullage becomes nonflammable. "Noncombustible gas" includes oxygen depleted air (often referred to as nitrogen enriched air (NEA)), nitrogen, or other inert gases. The nitrogen can be obtained from cryogenic storage bottles on board the aircraft or produced from the nitrogen in air.

The ullage fuel-air ratio for Jet A fuel is generally outside of the flammability region. However, known conditions exist that may result in Jet A in a fuel tank being flammable. One example includes a rapid reduction in tank ullage pressure after takeoff, such as when the aircraft climbs, during the time before fuel-tank temperature sufficiently decreases during cruise.

FAA regulations require that new and in-service transport aircraft include systems for enhancing the safety of aircraft fuel tanks. For protection against fire/explosion in the fuel tank ullage, several previous systems have been used. Such systems may be known by a number of designations including, but not limited to, On-Board Inert Gas Generation System (OBIGGS), Flammability Reduction System (FRS), Fuel Tank Inerting System (FTIS), etc. OBIGGS is applied most often to military aircraft that require much more stringent inerting requirements. FRS and FTIS are applied most often to commercial aircraft that use less stringent requirements for flammability reduction. OBIGGS is used in many commercial and cargo airplanes and military aircraft. A commonality among the systems involves reducing the oxygen content of fuel tank ullage by feeding noncombustible gas into the fuel tank. Often, the systems produce nitrogen-enriched air (NEA) for the noncombustible gas, such as with a Nitrogen Generation System (NGS).

Inerting systems used to produce noncombustible gas may rely on pressure swing absorption and desorption from media as a separation mechanism, or diffusion through membranes as another separation mechanism, to remove oxygen. In known inerting systems with hollow fiber membranes, compressed air enters the bore of the hollow fiber and oxygen permeates through the hollow fiber walls, where oxygen permeates more readily than nitrogen does. The oxygen permeate is collected and exhausted overboard. The remaining nitrogen-enriched retentate flows through the bore and is collected at the air separation module product gas outlet for distribution to aircraft fuel tanks. Unfortunately, service life of the air separation module might be limited by the materials used in construction of the module.

Accordingly, known ullage inerting systems can be expensive, complex, and increase the weight of the aircraft. It will be appreciated that ullage inerting systems that decrease system cost, simplify known systems, or decrease weight of the aircraft would be beneficial.

SUMMARY

A noncombustible gas distribution method includes providing noncombustible gas onboard an aircraft while in flight, the aircraft having left and right main wing tanks on opposite sides of the aircraft and a center wing tank between the left and right main wing tanks. Noncombustible gas is distributed to the center wing tank throughout a continuous, first flight period and, as a result, reduces flammability exposure time in which the center wing tank is flammable during the first flight period or during a subsequent flight period. The reduction is compared to the flammability exposure time that will otherwise occur during the first flight period or during the subsequent flight period without the distribution of the noncombustible gas to the center wing tank throughout the first flight period. The method includes not distributing noncombustible gas to the left and right main wing tanks while the noncombustible gas is distributed to the center wing tank throughout the first flight period and while the left and right main wing tanks are non-flammable.

Another noncombustible gas distribution method includes providing noncombustible gas onboard an aircraft while in flight, the aircraft having left and right main wing tanks on opposite sides of the aircraft and a center wing tank between the left and right main wing tanks. The method includes distributing the noncombustible gas to the center wing tank during flight when one or more of the following conditions 1A-1C are met and not distributing the noncombustible gas to the center wing tank during flight when none of the following conditions 1A-1C are met. The conditions include: 1A) the center wing tank contains a usable level of fuel; 1B) the aircraft is cruising in a pre-descent phase; and 1C) the aircraft is in a descent phase. The method also includes distributing the noncombustible gas to the left and right main wing tanks during flight when one or more of the following conditions 2A-2D are met and not distributing the noncombustible gas to the left and right main wing tanks during flight when none of the following conditions 2A-2D are met: 2A) the aircraft is climbing; 2B) the aircraft is cruising with the main wing tanks' O2% projected to be above an inert limit before fuel decreases below a lower flammability limit; 2C) the aircraft is cruising in the pre-descent phase; and 2D) the aircraft is in the descent phase at an altitude below a selected altitude.

A noncombustible gas distribution system includes a noncombustible gas source on an aircraft and left and right main wing tanks on opposite sides of the aircraft and a center wing tank between the left and right main wing tanks. The left and right main wing tanks each can have an inboard section and an outboard section. The sections are defined by baffle ribs between the sections, the baffle ribs defining the sections having less ullage communication area between the sections compared to the ullage communication area of other ribs within the sections.

The system includes noncombustible gas distribution tubing from the noncombustible gas source to the left and right main wing tanks and the center wing tank. One or more isolation valves in the noncombustible gas distribution tubing are operable to isolate the left and right main wing tanks and the center wing tank from receiving noncombustible gas. A distribution mechanism including first noncombustible gas flow restrictions is configured to balance noncombustible gas flow among the left and right main wing tanks and the center wing tank with the one or more isolation valves fully open. The distribution mechanism yields a greater proportion of noncombustible gas flow per tank unit volume distributed to the outboard section of the left and right main wing tanks compared to the inboard section during a climb phase of the aircraft's flight.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

In the context of the present document, "non-flammable" refers to one or more conditions selected from: a) fuel temperature and altitude yielding a fuel-air ratio below a lower flammability limit or above an upper flammability limit and b) oxygen content in the ullage below an inert limit. Most often, the measure selected for "oxygen content" is 02 volume percent (vol %) with inerting obtained at less than 12 vol % $O_2$ from sea level to 10,000 ft, then rising linearly to 14.5% $O_2$ at 40,000 ft for commercial aircraft operations.

Known ullage inerting systems include supplying nitrogen-enriched air to center wing tanks (CWTs) and main wing tanks (MWTs) of airplanes at the same time. Even so, the differing flammability conditions of center wing tanks compared to main wing tanks has not previously been recognized and used to an advantage. By studying a combination of modelled and measured flammability conditions, observation revealed that periods in which a center wing tank is flammable does not necessarily coincide with periods in which a main wing tank is flammable. Further observation revealed that inerting during certain periods in which FAA fleet-wide flammability requirements do not necessitate inerting can enable meeting FAA fleet-wide flammability requirements more efficiently. Also, additional tank inerting not required by FAA fleet-wide flammability requirements may be obtained.

As a result, strategically alternating noncombustible gas flow between the center wing tank and the main wing tanks may allow reduced operation of a Flammability Reduction System (FRS), such as those including the Nitrogen Generation System (NGS) and/or Nitrogen-Enriched Air Distribution System (NEADS) described herein. Instead, or in addition, strategically inerting may allow reduction in capacity (and thus size and weight) of the NGS. Similarly, strategically inerting a certain part of a main wing tank preferentially to other parts of the main wing tank and the center wing tank may allow reduced operation of the NGS and/or reduction in capacity (and thus size and weight) of the NGS.

Various flammability reduction strategies are described herein that may be implemented with different architectures. One example architecture includes a NEADS with isolation valves capable of selecting the center wing tank or the left and right main wing tanks. Another example includes a NEADS capable of targeted distribution of noncombustible gas in the main wing tanks. Strategies that share a common architecture may be combined into a single operation plan. Also, some architectural features corresponding to different strategies may be combined into a single NEADS or corresponding operation plan, such as combining targeted distribution of noncombustible gas in the main wing tanks with NEADS isolation valves capable of selecting distribution location.

Often, special conditions for the center wing tank warrant attention to flammability during the ground and the climb phases of an aircraft flight on warm days. Because of limited time on the ground with pressures sufficient to remove oxygen, observation has indicated that the descent phase of an aircraft flight could instead be considered to determine needed capacity of the inerting system for the center wing tank.

To meet FAA fleet-wide flammability requirements, generally, decreasing flammability during the cruise phase of an aircraft flight yields the highest impact. Main wing tank inerting during the cruise phase reduces flammability exposure time before the tank temperature falls below the low flammability limit. However, main wing tank inerting in ground and climb phases can be a factor for determining capacity of the NEADS since it could reduce flammability exposure time early in the cruise phase.

Figure 1:
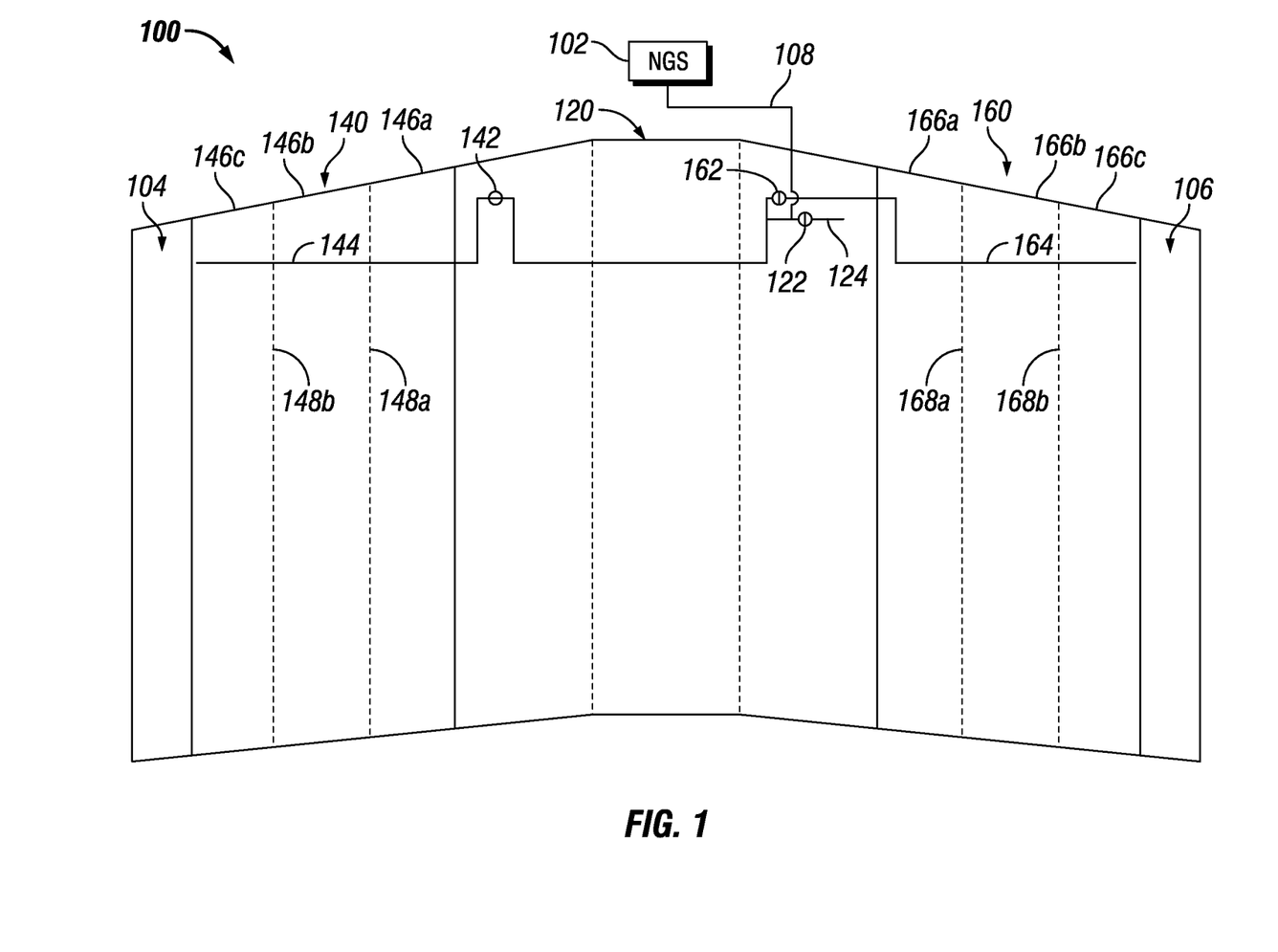
FIG. 1 is a schematic representing one example of a nitrogen-enriched air distribution system (NEADS).

FIG. 1 shows one example of an architecture with NEADS isolation valves that direct noncombustible gas to the main wing tanks and/or to the center wing tank depending on an operation plan determined by the flight phase, tank fuel level, fuel temperature, ullage pressure, and other possible factors. The inerting intent may be accomplished by directing noncombustible gas to the main wing tanks when the center tank does not need to be inerted. One example includes when the center wing tank does not contain fuel and was inerted during the previous flight and/or ground time operation of the inerting system.

FIG. 1 is a schematic diagram of one example of a nitrogen-enriched air distribution system (NEADS) 100 including a nitrogen generating system (NGS) 102. NGS 102 generates nitrogen enriched air (NEA) by using an Air Separation Module (ASM) with a membrane that preferentially diffuses oxygen from air. As known among those skilled in the art, NGS 102 provides numerous advantages over other sources for noncombustible gas, such as bottled nitrogen. Nevertheless, NGS 102 may be substituted for other noncombustible gas sources. Indeed, the methods and apparatuses described herein may be even more beneficial when used with other noncombustible gas sources, which often present an even greater need for nitrogen conservation.

NEADS 100 includes NGS tubing 108 that supplies NEA to center wing tank (CWT) isolation valve 122, left main wing tank (MWT) isolation valve 142, and right main wing tank (MWT) isolation valve 162. The system includes a CWT 120, a left MWT 140, and a right MWT 160. A left surge tank 104 and a right surge tank 106 provide surge capacity for excess fuel due to overfilling or thermal expansion. If valve 122 is open, then CWT tubing 124 supplies NEA from valve 122 to CWT 120. If valve 142 is open, then left MWT tubing 144 supplies NEA from valve 142 to left MWT 140. If valve 162 is open, then right MWT tubing 164 supplies NEA from valve 162 to right MWT 160.

Although FIG. 1 shows three isolation valves, it is conceivable that the methods described herein could be implemented with two valves. For example, one isolation valve could be operable to isolate the center wing tank and another isolation valve could be operable to isolate the left and right main wing tanks at the same time. This assumes that the left and right main wing tanks would use the same volume of NEA from the NGS merely split in two, which may generally be accurate. However, greater process flexibility could be provided with the three isolation valves of FIG. 1.

Cruise Phase Conditions.

When the center tank is empty and the $O_2$% is below the inert limit, the tank $O_2$% will not be increasing significantly during cruise. In cruise, the main wing tanks cool down faster than the center wing tank and become too cold to be flammable (fuel temperature would be below the Lower Flammability Limit). Therefore, the inerting system may be shut down during cruise to reduce consumption of engine bleed air or of power otherwise used to produce a supply of compressed air and thus reduces the fuel consumption. Reduced utilization of the system increases reliability of the system components. Reduced use of the NGS also reduces ozone impact on the life of an ASM. The NGS system may be turned on sufficiently ahead of descent in order to warm up the ASM and reduce fuel tank $O_2$% below the inert limit prior to the descent phase.

Descent and Ground Phase Conditions.

During descent, outside air enters the vent ports and the oxygen concentration of the bays adjacent to the ports quickly increases. The main wing tanks will frequently be too cold to be flammable in descent. Consequently, noncombustible gas may be routed to the center wing tank to reduce oxygen concentration ahead of landing. The center wing tank receives heat from nearby components in the aircraft fuselage. The heating is more pronounced on the ground with ground temperatures being higher than at altitude and without the heat losses associated with flight. NEADS control could ensure that the center wing tank is below the inert limit before the fuel heats up above the Lower Flammability Limit by directing all of the noncombustible gas to the center tank during descent or part of the descent phase. This stages the center tank below the inert limit on the ground after landing and ahead of the next flight, or reduces the need for the center tank inerting on the ground.

The center tank is typically larger than the main tanks. Also, the available noncombustible gas pressure and, for the gas separation membranes, the pressure ratios (across the gas separation membrane) are lower on the ground than they are at altitude. Consequently, it can be more efficient to inert the center tank during descent and to inert the main wing tanks on the ground. Reduction in inert system ground time operation improves reliability of the system by reducing exposure of the system to contaminants, which are, with the exception of ozone, highest on the ground. For bleed driven systems, favoring inerting during descent could reduce ground time operation of the inerting system and increase the likelihood of sufficient inerting during the ground phase. Inerting during descent may also reduce the need for restarting the inerting system prior to the next flight, thus reducing the duty cycle of the system components.

Noncombustible gas may be directed to main wing tanks again at a selected altitude during descent (for example, at 10,000 feet) to achieve sufficient inerting in all tanks by the end of inerting system ground time operations. After the center wing tank oxygen concentration is below the inert limit, all noncombustible gas flow might be directed to the main wing tanks throughout the ground time operation, depending on noncombustible gas distribution strategy during descent. Alternatively, noncombustible gas flow might be partially directed to the main wing tanks during ground time operation.

A tradeoff exists between the altitude selected for inerting main wing tanks in descent and ground time performance. If lower tank $O_2$% is produced by the system in descent, then less ground time operation is needed to inert the tanks before the next flight takeoff. Ground time operation can also be reduced if more noncombustible gas flow can be produced on the ground. However, ASM performance is driven by the pressure of supplied air and pressure ratio across the membrane. If bleed air pressure available on the ground is lower (or there is less power for non-bleed-driven inerting systems), then the reduced system efficiency will yield higher oxygen content in the tanks.

Climb Phase Conditions.

NEADS control may direct all noncombustible gas flow into the main wing tanks in the climb phase, when fuel evaporation, oxygen outgassing, and fuel consumption are all factors in inerting of fuel tanks. That is, during the climb phase, atmospheric pressure may decrease in the tank, allowing increased fuel evaporation into ullage. During the climb phase, fuel consumption increases the volume that needs to be inerted (fuel volume decreases) and also affects the gas flow that is venting into the atmosphere, which also affects the oxygen concentration in the tank. Finally, when ullage pressure decreases, oxygen dissolved in fuel will outgas (be liberated from fuel) and increase oxygen level in the ullage.

Generally, center wing tank fuel is expended before using main wing tank fuel. As a result, the flights with less than full main wing tanks would not be carrying center tank fuel. With the center wing tank being inerted after the previous flight and negligible evaporation from the unusable fuel remaining, the center wing tank would remain inerted during climb as well.

Even so, noncombustible gas could be distributed to all tanks when other conditions warranted center wing tank inerting. Distribution to all tanks reduces the potential overall flow from 50% to each main wing tank (when only distributing to main wing tanks with the center wing tank isolation valve closed) to a significantly less portion of the total flow. With the center wing tank isolation valve open, the amount of flow distributed to the main tanks depends on the main tank volume and system sizing strategies.

With the main wing tanks full and some center wing tank fuel loaded, there might not be a need to inert the main wing tanks during the climb phase. Main wing tank flammability exposure will be low and ignition sources will be covered to a large extent. Therefore, noncombustible gas could be directed in its entirety to the center wing tank during the climb phase to combat increased fuel evaporation into ullage from decreased pressure and/or influx of outside air from the fuel level decrease.

Implementation. The described approaches to noncombustible gas control facilitates inerting and can enable a smaller NGS system size and weight, e.g., use of fewer and/or smaller capacity Air Separation Modules. Therefore, other components of the NGS system, such as heat exchanger, filter, ozone converter, etc., may be of smaller size and weight.

Figure 2:
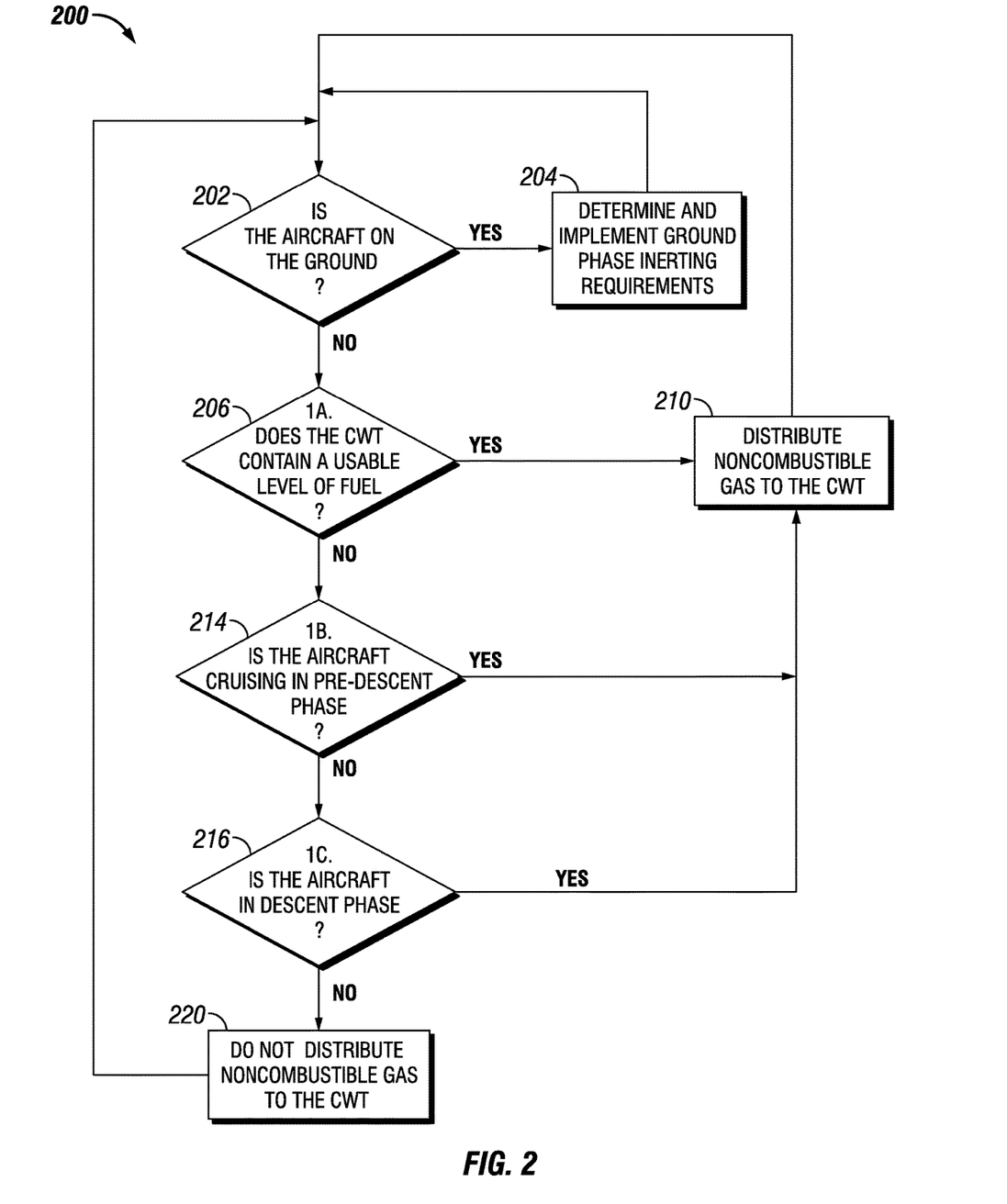
FIGS. 2 and 3 are process flow diagrams for distributing noncombustible gas to the center wing tank and main wing tanks, respectively.
Figure 3:
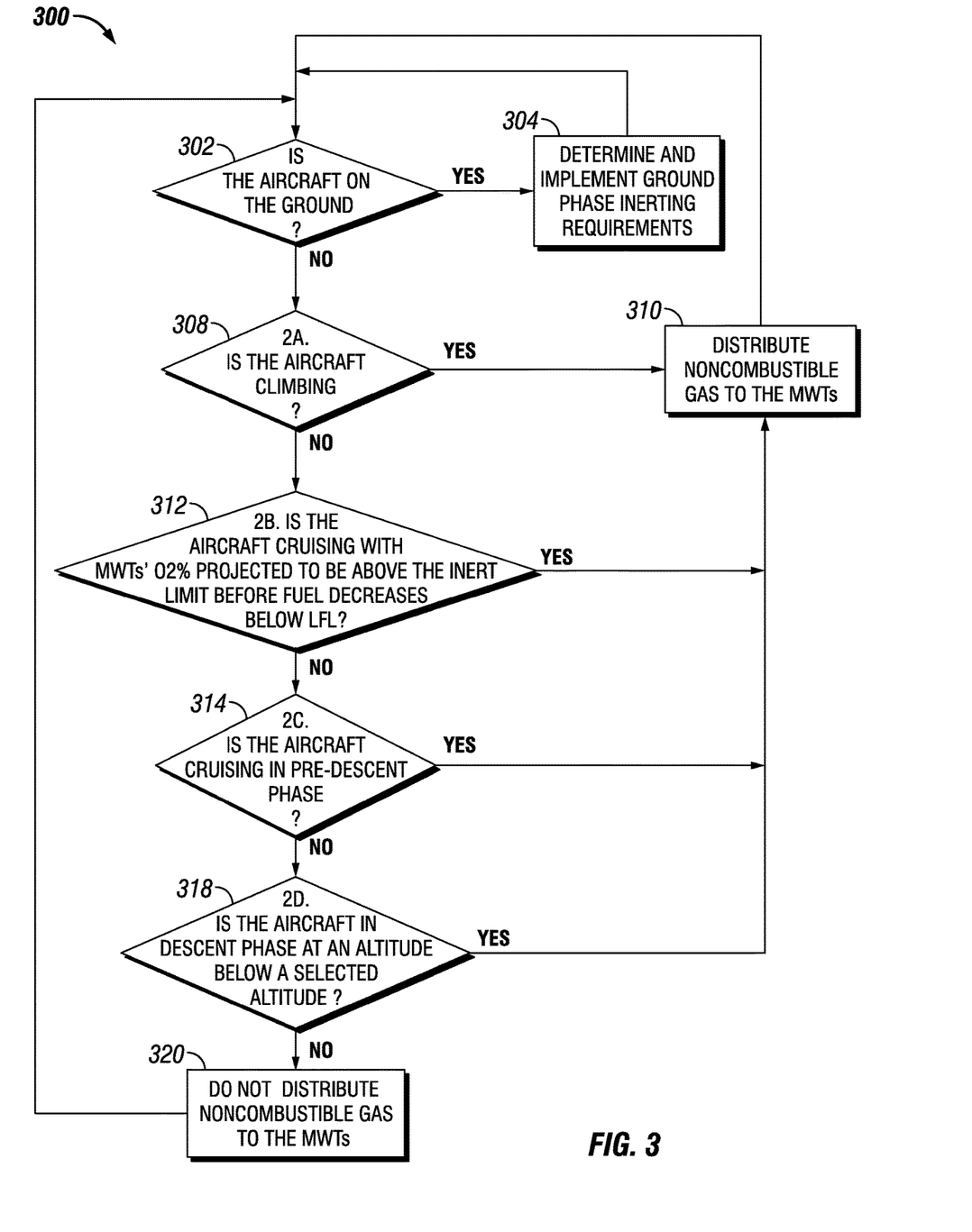

FIGS. 2 and 3 show evaluation processes for the CWT and MWTs, respectively, to determine when not to distribute noncombustible gas to the tanks to reduce demand for noncombustible gas. FIGS. 2 and 3 are implemented in Hypothetical Examples 1-3. With reduced demand for noncombustible gas while achieving a selected overall, fleet-wide flammability exposure time, NGS capacity (and thus size and weight) may be reduced.

In FIG. 2, an iterative process 200 includes conditions 1A-1C prompting when to distribute noncombustible gas to the CWT, turning off noncombustible gas distribution at other times to reduce demand for noncombustible gas. Process 200 includes an inquiry 202 into whether the aircraft is on the ground. If the aircraft is on the ground, then ground phase inerting requirements are determined and implemented in an action 204. The present document discusses possibilities for ground phase inerting requirements explained throughout the text as at least partly depending on inerting selections made during other phases of a flight profile. As a result, ground phase inerting requirements include turning off noncombustible gas distribution. If the aircraft is not on the ground, then process 200 includes further inquiries.

Inquiry 206 includes condition 1A and asks whether the CWT contains a usable level of fuel. If so, then process 200 includes implementing an action 210 that distributes noncombustible gas to the CWT. If not, then process 200 includes further inquiries.

Inquiry 214 includes condition 1B and asks whether the aircraft is cruising in the pre-descent phase. If so, then process 200 includes implementing action 210 that distributes noncombustible gas to the CWT. If not, then process 200 includes a further inquiry.

Inquiry 216 includes condition 1C and asks whether the aircraft is in the descent phase. If so, then process 200 includes implementing action 210 that distributes noncombustible gas to the CWT. If not, then process 200 includes implementing an action 220 not to distribute noncombustible gas to the CWT. Process 200 repeats after actions 204, 210, and 220 to detect changes in the conditions of inquiries 202, 206, 214, and 216. Process 200 will not prompt distribution of noncombustible gas to the CWT for aircraft in flight that fail to meet any of conditions 1A-1C, reducing demand for noncombustible gas.

In FIG. 3, an iterative process 300 includes conditions 2A-2D prompting when to distribute noncombustible gas to the MWTs, turning off noncombustible gas distribution at other times to reduce demand for noncombustible gas. Process 300 includes an inquiry 302 into whether the aircraft is on the ground. If the aircraft is on the ground, then ground phase inerting requirements are determined and implemented in an action 304. The present document discusses possibilities for ground phase inerting requirements explained throughout the text as at least partly depending on inerting selections made during other phases of a flight profile. As a result, ground phase inerting requirements include turning off noncombustible gas distribution. If the aircraft is not on the ground, then process 300 includes further inquiries.

Inquiry 308 includes condition 2A and asks whether the aircraft is climbing. If so, then process 300 includes implementing an action 310 that distributes noncombustible gas to the MWTs. If not, then process 300 includes further inquiries.

Inquiry 312 includes condition 2B and asks whether the aircraft is cruising with the MWTs' $O_2$% projected to be above the inert limit before the fuel decreases below the LFL. If so, then process 300 includes implementing an action 310 that distributes noncombustible gas to the MWTs. If not, then process 300 includes further inquiries.

Inquiry 314 includes condition 2C and asks whether the aircraft is cruising in the pre-descent phase. If so, then process 300 includes implementing action 310 that distributes noncombustible gas to the MWTs. If not, then process 300 includes a further inquiry.

Inquiry 318 includes condition 2D and asks whether the aircraft is in the descent phase at an altitude below a selected altitude. If so, then process 300 includes implementing action 310 that distributes noncombustible gas to the MWTs.

If not, then process 300 includes implementing an action 320 not to distribute noncombustible gas to the MWTs. Process 300 repeats after actions 304, 310, and 320 to detect changes in the conditions of inquiries 302, 308, 312, 314, and 318. Process 300 will not prompt distribution of noncombustible gas to the MWTs for aircraft in flight that fail to meet any of conditions 2A-2D, reducing demand for noncombustible gas.

Although FIGS. 2 and 3 list certain conditions that prompt distribution of noncombustible gas to the tanks, it is conceivable that further conditions prompting distribution could be added. Each of conditions 1A-1C and 2A-2D were selected to work in conjunction to achieve synergistic benefits that reduce demand for noncombustible gas while keeping flammability exposure within acceptable limits. Even though adding further conditions would not reduce demand for noncombustible gas as much, a modified process could still realize some reduction in demand. It is also conceivable that process 200 or 300 could be modified by leaving out one or more of conditions 1A-1C and 2A-2D. Even though leaving out one or more of conditions 1A-1C and 2A-2D would increase flammability exposure, a modified process might still operate within acceptable limits for a smaller range of flight scenarios.

Hypothetical Examples 1-3 described below provide a selection of four possible flight scenarios that may be encountered and four possible NEADS operation plans that implement some or all of the principles described herein. The examples demonstrate a few possible applications of the methods and apparatuses disclosed herein. Those of ordinary skill will appreciate that the operation plans in Hypothetical Examples 1-3 assume fuel usage from certain tanks during certain flight phases. A given NEADS operation plan may be easily modified to accommodate switching between the CWT and MWTs at different intervals while still applying the principles described herein.

Although each example does not necessarily use noncombustible gas inerting during the ground phase, such operation assumes adequate inerting at start of ground time operation of the inerting system, which might not be achieved. Accordingly, another modification within the scope of the methods and apparatuses herein includes distributing noncombustible gas where needed during ground time operations to offset any inerting deficiency.

The examples assume use of a Flammability Reduction System (FRS) as the inerting system with a NEADS, such as shown in FIG. 1, including a Nitrogen Generation System (NGS) that produces NEA as the noncombustible gas. The NGS may include an Air Separation Module with hollow fiber membranes. Even so, it will be appreciated that the principles applied in Examples 1-3 might be used in other inerting systems.

Hypothetical Example 1

NEADS valves are operational to select distribution location.
Ground Phase Before Takeoff:
CWT—empty; MWTs—partially full. The CWT will be inert prior to takeoff.
Climb Phase:
CWT—No NEA; MWTs—Yes NEA. No change in CWT $O_2$% during climb. Inerting capacity is distributed to MWTs.
Cruise Phase:
CWT—No NEA until pre-descent; MWTs—Yes NEA for limited period of time and again at pre-descent for warm up. NEA will continue to flow after the climb phase until the MWTs are sufficiently inerted such that the oxygen increase due to fuel consumption will not rise above the inert limit before the fuel temperature is reduced below the Lower Flammability Limit. A longer NGS shut down during the cruise phase could be obtained with monitoring or with analytical determination, such as modeling, without a sensor input that confirms when fuel tank flammability exposure is met. Oxygen will rise in the MWTs because air will be drawn in as fuel gets consumed. There will be additional oxygen released in outgassing in step climbs and/or changes in altitudes for route adjustments. Oxygen can also rise in the CWT as air is drawn in due to cooling and vent dynamics due to MWTs' operation. FRS may be turned on sufficiently ahead of descent to warm up the ASM and to lower the CWT and/or MWTs oxygen prior to descent.
Descent Phase:
CWT—Yes NEA; MWTs—Yes NEA below selected altitude. As air enters vent ports, the CWT is inerted first in preparation for ground time while MWTs remain below LFL. At a selected altitude, inerting to MWTs starts in preparation for ground time. In selecting when to start MWT inerting, consideration is given to when the FRS was turned on during pre-descent. Often, with hollow fiber membranes in an ASM, the FRS is turned on prior to descent by some significant period of time in order to warm the fibers to increase performance during descent. Flow would be to the center tank only initially during descent. Flow to the MWTs would be initiated soon enough in descent to inert the MWTs for the next flight before takeoff. The altitude at which MWT inerting begins will depend on the operation plan selected to achieve a specific overall, fleetwide flammability exposure time.
Ground Phase after Landing:
CWT—No NEA; MWTs—No NEA. The CWT and MWTs are inerted during descent to remain inert during ground time. As an alternative, system capacity might be reduced by utilizing ground time operation of FRS. If the CWT is sufficiently inerted by landing, then all NEA could be directed to MWTs after landing. As a further alternative, the CWT could have limited ground time inerting after which all flow could be directed to MWTs.

Hypothetical Example 2

NEADS valves are operational to select distribution location.
Ground Phase Before Takeoff:
CWT—empty; MWTs—fuel full. The CWT will be inert prior to takeoff. "Fuel full" means a tank is at capacity.
Climb Phase:
CWT—No NEA unless warranted by conditions; MWTs—Yes NEA.
Cruise Phase:
CWT—No NEA until pre-descent unless warranted by conditions; MWTs—Yes NEA for limited period of time and again at pre-descent for warm up. NEA will continue to flow after the climb phase until the MWTs are sufficiently inerted such that the oxygen increase due to fuel consumption will not rise above the inert limit before the fuel temperature is reduced below the Lower Flammability Limit. A longer NGS shut down during the cruise phase could be obtained with monitoring or with analytical determination, such as modeling, without a sensor input that confirms when fuel tank flammability exposure is met. Oxygen will rise in the MWTs because air will be drawn in as fuel gets consumed. There will be additional oxygen released in outgassing in step climbs and/or changes in altitudes for route adjustments. Oxygen can also rise in the CWT as air is drawn in due to cooling and vent dynamics due to MWTs' operation. FRS may be turned on sufficiently ahead of descent to warm up the ASM and to lower the CWT and/or MWTs oxygen prior to descent.
Descent Phase:
CWT—Yes NEA; MWTs—Yes NEA below selected altitude. As air enters vent ports, the CWT is inerted first in preparation for ground time while MWTs remain below LFL. At a selected altitude, inerting to MWTs starts in preparation for ground time. In selecting when to start MWT inerting, consideration is given to when the FRS was turned on during pre-descent. Often, with hollow fiber membranes in an ASM, the FRS is turned on prior to descent by some significant period of time in order to warm the fibers to increase performance during descent. Flow would be to the center tank only initially during descent. Flow to the MWTs would be initiated soon enough in descent to inert the MWTs for the next flight before takeoff. The altitude at which MWT inerting begins will depend on the operation plan selected to achieve a specific overall, fleetwide flammability exposure time.
Ground Phase after Landing:
CWT—No NEA; MWTs—No NEA. The CWT and MWTs are inerted during descent to remain inert during ground time. As an alternative, system capacity might be reduced by utilizing ground time operation of FRS. If the CWT is sufficiently inerted by landing, then all NEA could be directed to MWTs after landing. As a further alternative, the CWT could have limited ground time inerting after which all flow could be directed to MWTs.

Hypothetical Example 3

NEADS valves are operational to select distribution location.

Ground Phase Before Takeoff:

CWT—fuel full or partially full; MWTs—fuel full. The CWT will be inert prior to takeoff. "Fuel full" means a tank is at capacity.

Climb Phase:

CWT—Yes NEA; MWTs—Yes NEA.

Cruise Phase:

CWT—Yes NEA until the CWT is empty and again at pre-descent for warmup; MWTs—Yes NEA for a limited period of time and again at pre-descent for warm up. CWT $O_2$% during cruise will not change after empty. MWT inerting can be shut off at the same time as CWT inerting if flammability exposure requirements are met. For example, MWT fuel temperature may be below the lower flammability limit at that time and would not need inerting even though oxygen level will increase as tank level decreases and air enters ullage. NEA will continue to flow after the climb phase until the MWTs are sufficiently inerted such that the oxygen increase due to fuel consumption will not rise above the inert limit before the fuel temperature is reduced below the Lower Flammability Limit. A longer NGS shut down during the cruise phase could be obtained with monitoring or with analytical determination, such as modeling, without a sensor input that confirms when fuel tank flammability exposure is met. Oxygen will rise in the MWTs because air will be drawn in as fuel gets consumed. There will be additional oxygen released in outgassing in step climbs and/or changes in altitudes for route adjustments. Oxygen can also rise in the CWT as air is drawn in due to cooling and vent dynamics due to MWTs' operation. FRS may be turned on sufficiently ahead of descent to warm up the ASM and to lower the CWT and/or MWT oxygen prior to descent.

Descent Phase:

CWT—Yes NEA; MWTs—Yes NEA below selected altitude. As air enters vent ports, the CWT is inerted first in preparation for ground time while MWTs remain below LFL. At a selected altitude, inerting to MWTs starts in preparation for ground time. In selecting when to start MWT inerting, consideration is given to when the FRS was turned on during pre-descent. Often, with hollow fiber membranes in an ASM, the FRS is turned on prior to descent by some significant period of time in order to warm the fibers to increase performance during descent. Flow would be to the center tank only initially during descent. Flow to the MWTs would be initiated soon enough in descent to inert the MWTs for the next flight before takeoff. The altitude at which MWT inerting begins will depend on the operation plan selected to achieve a specific overall, fleetwide flammability exposure time.

Ground Phase after Landing:

CWT—No NEA; MWTs—No NEA. The CWT and MWTs are inerted during descent to remain inert during ground time. As an alternative, system capacity might be reduced by utilizing ground time operation of FRS. If the CWT is sufficiently inerted by landing, then all NEA could be directed to MWTs after landing. As a further alternative, the CWT could have limited ground time inerting after which all flow could be directed to MWTs.

Summary Table (Hypothetical Examples 1-3)

| Tank | Before Takeoff | Climb | Cruise | Descent | Ground |
|---|---|---|---|---|---|
| Ex. 1 CWT | Empty | No NEA | No NEA until pre-descent | Yes NEA | No NEA |
| Ex. 1 MWTs | Part Full | Yes NEA | Yes NEA for limited period and at pre-descent | Yes NEA below selected altitude | No NEA |
| Ex. 2 CWT | Empty | No NEA unless warranted by conditions | No NEA until pre-descent unless warranted by conditions | Yes NEA | No NEA |
| Ex. 2 MWTs | Full | Yes NEA | Yes NEA for limited period and at pre-descent | Yes NEA below selected altitude | No NEA |
| Ex. 3 CWT | Part Full or Full | Yes NEA | Yes NEA until CWT is empty and at pre-descent | Yes NEA | No NEA |
| Ex. 3 MWTs | Full | Yes NEA | Yes NEA for limited period and at pre-descent | Yes NEA below selected altitude | No NEA |

One noncombustible gas distribution method includes providing noncombustible gas onboard an aircraft while in flight, the aircraft having left and right main wing tanks on opposite sides of the aircraft and a center wing tank between the left and right main wing tanks. Noncombustible gas is distributed to the center wing tank throughout a continuous, first flight period and, as a result, reduces flammability exposure time in which the center wing tank is flammable during the first flight period or during a subsequent flight period. The reduction is compared to the flammability exposure time that will otherwise occur during the first flight period or during the subsequent flight period without the distribution of the noncombustible gas to the center wing tank throughout the first flight period. The method includes not distributing noncombustible gas to the left and right main wing tanks while the noncombustible gas is distributed to the center wing tank throughout the first flight period and while the left and right main wing tanks are non-flammable.

By way of example, one or more of the following conditions may be met throughout the first flight period: 1A) the center wing tank contains a usable level of fuel; 1B) the aircraft is cruising in a pre-descent phase; and 1C) the aircraft is in a descent phase. Also, it may be that none of the following conditions are met throughout the first flight period: 2A) the aircraft is climbing; 2B) the aircraft is cruising with the main wing tanks' $O_2$% projected to be above an inert limit before fuel decreases below a lower flammability limit; 2C) the aircraft is cruising in the pre-descent phase; and 2D) the aircraft is in the descent phase at an altitude below a selected altitude.

The method may further include not distributing the noncombustible gas to the center wing tank throughout a continuous, second flight period in which the center wing tank is non-flammable, the second flight period not overlapping with the first flight period. Still further, the method may include distributing the noncombustible gas to the left and right main wing tanks throughout the second flight period and, as a result, reducing flammability exposure time in which the left and right main wing tanks are flammable during the second flight period or during a subsequent flight period. The reduction is compared to the flammability exposure time that will otherwise occur during the second flight period or during the subsequent flight period without the distribution of the noncombustible gas to the left and right main wing tanks throughout the second flight period.

It may be that none of the following conditions are met throughout the second flight period: 1A) the center wing tank contains a usable level of fuel; 1B) the aircraft is cruising in a pre-descent phase; and 1C) the aircraft is in a descent phase. One or more of the following conditions may be met throughout the second flight period: 2A) the aircraft is climbing; 2B) the aircraft is cruising with the main wing tanks' $O_2$% projected to be above an inert limit before fuel decreases below a lower flammability limit; 2C) the aircraft is cruising in the pre-descent phase; and 2D) the aircraft is in the descent phase at an altitude below a selected altitude. The first flight period may occur during a descent phase. The second flight period may occur during a climb phase or during a cruise phase.

Instead, the method may further include distributing the noncombustible gas to the left and right main wing tanks throughout a continuous, third flight period, the third flight period not overlapping with the first or second flight periods, and, as a result, reducing flammability exposure time in which the left and right main wing tanks are flammable during the third flight period or during a subsequent flight period. The reduction is compared to the flammability exposure time that will otherwise occur during the third flight period or during the subsequent flight period without the distribution of the noncombustible gas to the left and right main wing tanks. Noncombustible gas is not distributed to the center wing tank while the noncombustible gas is distributed to the left and right main wing tanks throughout the third flight period and while the center tank is non-flammable. As an example, the first flight period may occur during a descent phase, the second flight period may occur during a climb phase, and the third flight period may occur during a cruise phase.

Non-flammability in the various methods may occur because of one or more conditions selected from: a) fuel temperature and altitude yielding a fuel-air ratio below a lower flammability limit or above an upper flammability limit and b) oxygen content in the ullage below an inert limit.

When the second flight period occurs during the climb phase, the method may further include the left and right main wing tanks each having an inboard section and an outboard section. The sections are defined by baffle ribs between the sections, the baffle ribs defining the sections having less ullage communication area between the sections compared to the ullage communication area of other ribs within the sections. The method includes distributing the noncombustible gas to the left and right main wing tanks throughout the second flight period at a greater proportion of noncombustible gas flow per tank unit volume to the outboard section compared to the inboard section during the climb phase.

In the methods described herein, the distribution of the noncombustible gas to the left and right main wing tanks throughout the second flight period may occur through a noncombustible gas distribution system including a noncombustible gas source on the aircraft. The left and right main wing tanks each have an inboard section and an outboard section. The sections are defined by baffle ribs between the sections, the baffle ribs defining the sections having less ullage communication area between the sections compared to the ullage communication area of other ribs within the sections.

The system includes noncombustible gas distribution tubing from the noncombustible gas source to the left and right main wing tanks and the center wing tank. One or more isolation valves in the noncombustible gas distribution tubing are operable to isolate the left and right main wing tanks and the center wing tank from receiving noncombustible gas. A distribution mechanism including first noncombustible gas flow restrictions balances noncombustible gas flow among the left and right main wing tanks and the center wing tank with the one or more isolation valves fully open. The distribution mechanism yields a greater proportion of noncombustible gas flow per tank unit volume distributed to the outboard section of the left and right main wing tanks compared to the inboard section during the second flight period occurring during the climb phase.

Instead of a NEADS operation plan that involves switching NEA flow between the CWT and MWTs, such as by using isolation valves 122, 142, and 162 of FIG. 1, an architecture with or without isolation valves may be implemented with related benefits. If present, the isolation valves may remain open throughout NGS operation. A simplified NEADS operation plan increases reliability (less valve cycling), simplifies built-in tests of the valves, and can enable removal of one or more valves if the NEA distribution into the CWT and into different sections of the MWTs is balanced in a way that direction of NEA to either the CWT or MWTs only would not be needed.

Simplification of the NEADS operation plan can be obtained by observing or modeling flammability exposure without operation of the NGS and providing a targeted architecture. Main wing tanks are often divided into sections by one or more baffle ribs that impede ullage distribution. $O_2$ in ullage distribution considerations may thus include how conditions in the sections may differ. Other ribs that are not considered to be "baffle ribs" may be within a section and have more communication area such that they do not impede ullage distribution. Baffle ribs with less communication area act as a barrier to ullage mixing.

FIG. 1 shows left MWT 140 divided into inboard section 146*a*, middle section 146*b*, and outboard section 146*c* by baffle ribs 148*a* and 148*b*. Right MWT 160 is divided into inboard section 166*a*, middle section 166*b*, and outboard section 166*c* by baffle ribs 168*a* and 168*b*.

Although the FIG. 1 description herein assumes three sections in the main wing tanks defined by two baffle ribs, the simplified NEADS operation plan can be implemented for tanks with a different number of sections and baffle ribs. In implementations for three or more baffle ribs forming four or more sections, an outboard section, an inboard section, and multiple middle sections will exist. One or more of the multiple middle sections may take on the conditions of middle sections 146*b*/166*b* described herein. In implementations with only one baffle rib forming two sections, an outboard section and an inboard section will exist. No section will be present to take on the conditions of middle sections 146*b*/166*b* described herein.

The most inboard section may have the highest fuel temperature because fuel in this section is often used as heat sink for hydraulic heat exchangers. The inboard and middle sections are expected to have higher cruise flammability exposure because they have less heat loss than the outboard section, which may carry less fuel and have higher surface to volume ratio. However the most outboard section can be harder to inert because it contains venting features such that the influx of ambient air can quickly raise the oxygen content. Consequently, different sections may have different considerations for inerting during different flight phases.

The outboard section may have the highest ground time and climb phase flammability exposure because of the influence of heating on the ground with its higher surface-to-volume ratio, solar loads, and lower fuel level for shorter flights. For longer flights the outboard section has ullage even when the other sections have none. That is because wings often have an upward angle from horizontal (e.g. dihedral angle) that results in the outboard section being higher than the inboard section. Fuel fills the inboard sections for longer flights while the ullage space is forced outboard to the higher sections of the tank. The ullage space then moves inboard as fuel is consumed until the fuel level drops below the top of the most inboard section. At that time all sections have ullage.

Accordingly, the outboard section has higher flammability on the ground and in climb. However, the outboard section cools down in cruise faster due to convective cooling. Given that the cruise phase is typically the longest phase in the flight profile, it drives fleet wide flammability exposure. The outboard section, therefore, also has the lowest descent flammability exposure of all sections in the main wing tanks. As a result, from the perspective of fleet-wide flammability exposure, the other sections of the main wing tanks are expected to have the higher flammability exposure than the outboard section.

For reduction of the climb flammability exposure, NEA may be directed to the main wing tanks when the center wing tank is empty and/or NEA delivery can be sized and configured to deliver more NEA into the section with higher flammability exposure in climb. NEA distribution may be developed by observing the tank $O_2$% in individual sections (including center wing tank sections) at takeoff, top of climb, top of descent, and at landing. NEA flow duration to reach the inert limit may be calculated from the observations. The NEA distribution can be determined by balancing the center wing and main wing tanks' sections for a subset of selected single flights based on the $O_2$% at different times in the operation of the airplane.

Distributing the NEA flow in a manner that reduces the tank section $O_2$% by top of climb leads to lower climb and cruise flammability exposure and, therefore, lower overall fleet-wide flammability exposure. The $O_2$% will vary between sections for flights with different fuel levels, so a subset of relevant flights may be selected. The flights where the sections of the main wing tanks are considered flammable are the ones owing the most attention. For example, long flights where the middle section is full in climb will not be a driver for that section. Ground $O_2$% after landing is significant because it influences the ground exposure for the flight that follows and its climb exposure as well.

The center wing tank has a higher flammability exposure compared to the main wing tanks. The FAA Flammability rule has special warm-day ground and warm-day climb inerting specifications. As such, NEA may be distributed so that, for the selected flights, the center wing tank $O_2$% is below the inert limit by top of climb. That special measure not only lowers the climb exposure, but also lowers the cruise flammability exposure, which is the predominant driver for the fleet-wide flammability exposure. By the end of ground time operation, NEA distribution may decrease center wing tank $O_2$% below the inert limit to impact flammability exposure on the ground for the next flight and its climb flammability as well. In addition, with a descent NEA distribution strategy, the center wing tank can be inert (or close to inert) by the time of landing to reduce ground time operation or to permit directing ground time operation to the main wing tanks.

Accordingly, a distribution mechanism may include NEA flow restrictions configured to balance NEA flow with the one or more isolation valves fully open to increase inerting in a selected MWT section for a selected flight phase. The NEA flow restrictions may include sizing the NEA delivery differently to different sections of the tank. The most NEA would be delivered to the section exhibiting the highest flammability exposure during the selected flight phase when not distributing NEA in that flight phase. Sizing the NEA delivery would include consideration of the dynamics of the tank mixing between sections.

One noncombustible gas distribution system includes a noncombustible gas source on an aircraft and left and right main wing tanks on opposite sides of the aircraft and a center wing tank between the left and right main wing tanks. The left and right main wing tanks each can have an inboard section and an outboard section. The sections are defined by baffle ribs between the sections, the baffle ribs defining the sections having less ullage communication area between the sections compared to the ullage communication area of other ribs within the sections.

The system includes noncombustible gas distribution tubing from the noncombustible gas source to the left and right main wing tanks and the center wing tank. One or more isolation valves in the noncombustible gas distribution tubing are operable to isolate the left and right main wing tanks and the center wing tank from receiving noncombustible gas. A distribution mechanism including first noncombustible gas flow restrictions is configured to balance noncombustible gas flow among the left and right main wing tanks and the center wing tank with the one or more isolation valves fully open. The distribution mechanism yields a greater proportion of noncombustible gas flow per tank unit volume distributed to the outboard section of the left and right main wing tanks compared to the inboard section during a climb phase of the aircraft's flight.

By way of example, the distribution mechanism may further include second noncombustible gas flow restrictions configured to balance noncombustible gas flow with the one or more isolation valves fully open to render the center wing tank non-flammable by a top of the climb phase. The first noncombustible gas flow restrictions may include openings through noncombustible gas distribution tubing in the inboard and outboard sections of a selected size and/or number sufficient to yield the greater proportion of noncombustible gas flow per tank unit volume distributed to the outboard section of the left and right main wing tanks.

The one or more isolation valves may be two or more isolation valves, one of the isolation valves being operable to isolate the center wing tank and one or more of the isolation valves being operable to isolate the left and right main wing tanks. The system may further include an isolation valve controller operationally linked to the two or more isolation valves, the isolation valve controller being configured to implement any one of the methods described herein. The one or more isolation valves operable to isolate the left and right main wing tanks may be two isolation valves, one being operable to isolate the left main wing tank and another being operable to isolate the right main wing tank.

The inventors expressly contemplate that the various options described herein for individual methods and devices are not intended to be so limited except where incompatible.

The features and benefits of individual methods herein may also be used in combination with devices and other methods discussed herein even though not specifically indicated elsewhere. Similarly, the features and benefits of individual devices herein may also be used in combination with methods and other devices discussed herein even though not specifically indicated elsewhere.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A noncombustible gas distribution method comprising:
distributing the noncombustible gas to a center wing tank of an aircraft throughout a continuous, first flight period and, as a result, reducing flammability exposure time in which the center wing tank is flammable during the first flight period or during a subsequent flight period compared to the flammability exposure time that will otherwise occur during the first flight period or during the subsequent flight period without the distribution of the noncombustible gas to the center wing tank throughout the first flight period; and
not distributing noncombustible gas to a left main wing tank and a right main wing tank of the aircraft while the noncombustible gas is distributed to the center wing tank throughout the first flight period and while the left and right main wing tanks are non-flammable, wherein the left and right main wing tanks are on opposite sides of the aircraft with the center wing tank being between the left and right main wing tanks.

2. The method of claim 1 further comprising:
opening a first isolation valve throughout the continuous, first flight period;
closing a second isolation valve throughout the continuous, first flight period; and
closing a third isolation valve throughout the continuous, first flight period.

3. The method of claim 2, wherein opening the first isolation valve permits noncombustible gas to be distributed to the center wing tank and wherein closing the second and third isolation valves prevents noncombustible gas to be distributed to the left and right main wing tanks.

4. The method of claim 1 further comprising not distributing the noncombustible gas to the center wing tank throughout a continuous, second flight period in which the center wing tank is non-flammable, the second flight period not overlapping with the first flight period.

5. The method of claim 4 further comprising closing a first isolation valve throughout the continuous, second flight period, wherein closing the first isolation valve prevents noncombustible gas to be distributed to the center wing tank.

6. The method of claim 5 further comprising distributing the noncombustible gas to the left and right main wing tanks throughout the second flight period and, as a result, reducing flammability exposure time in which the left and right main wing tanks are flammable during the second flight period or during a subsequent flight period compared to the flammability exposure time that will otherwise occur during the second flight period or during the subsequent flight period without the distribution of the noncombustible gas to the left and right main wing tanks throughout the second flight period.

7. The method of claim 6, further comprising opening a second isolation valve and a third isolation valve throughout the continuous, second flight period, wherein opening the second and third isolation valves permit noncombustible gas to be distributed to the left and right main wing tanks.

8. The method of claim 7 wherein non-flammability occurs because of one or more condition selected from: a) fuel temperature and altitude yielding a fuel-air ratio below a lower flammability limit or above an upper flammability limit and b) oxygen content in an ullage below an inert limit.

9. The method of claim 7 further comprising:
distributing the noncombustible gas to the left and right main wing tanks throughout a continuous, third flight period, the third flight period not overlapping with the first or second flight periods, and, as a result, reducing flammability exposure time in which the left and right main wing tanks are flammable during the third flight period or during a subsequent flight period compared to the flammability exposure time that will otherwise occur during the third flight period or during the subsequent flight period without the distribution of the noncombustible gas to the left and right main wing tanks; and
not distributing noncombustible gas to the center wing tank while the noncombustible gas is distributed to the left and right main wing tanks throughout the third flight period and while the center tank is non-flammable.

10. The method of claim 9 wherein the first flight period occurs during a descent phase, the second flight period occurs during a climb phase, and the third flight period occurs during a cruise phase.

11. The method of claim 7 wherein the first flight period occurs during a descent phase and the second flight period occurs during a climb phase or a cruise phase.

12. The method of claim 11 further comprising:
wherein the left and right main wing tanks each having an inboard section and an outboard section each having baffle ribs and other ribs, the sections being defined by baffle ribs between the sections, the baffle ribs defining the sections having less ullage communication area between the sections compared to the ullage communication area of the other ribs within the sections; and
distributing the noncombustible gas to the left and right main wing tanks throughout the second flight period at a greater proportion of noncombustible gas flow per tank unit volume to the outboard section compared to the inboard section during the climb phase.

13. The method of claim 11 wherein the distribution of the noncombustible gas to the left and right main wing tanks throughout the second flight period occurs through a noncombustible gas distribution system comprising:
a noncombustible gas source on the aircraft;
the left and right main wing tanks each having an inboard section and an outboard section each having baffle ribs and other ribs, the sections being defined by baffle ribs between the sections, the baffle ribs defining the sections having less ullage communication area between the sections compared to the ullage communication area of the other ribs within the sections;
noncombustible gas distribution tubing from the noncombustible gas source to the left and right main wing tanks and the center wing tank, wherein the first, second, and third isolation valves are in the noncombustible gas distribution tubing;

wherein the first, second, and third isolation valves are operable to isolate the left and right main wing tanks and the center wing tank from receiving noncombustible gas; and a distribution mechanism including first noncombustible gas flow restrictions balancing noncombustible gas flow among the left and right main wing tanks and the center wing tank with the first, second, and third isolation valves fully open to yield a greater proportion of noncombustible gas flow per tank unit volume distributed to the outboard section of the left and right main wing tanks compared to the inboard section during the second flight period occurring during the climb phase.

14. A noncombustible gas distribution method comprising:

opening a first isolation valve to distribute noncombustible gas to a center wing tank of an aircraft during flight each time one or more of the following conditions 1A-1C are met, the center tank being positioned between a left main wing tanks and a right main wing tank of the aircraft and closing the first isolation valve to not distribute the noncombustible gas to the center wing tank during flight when none of the following conditions 1A-1C are met:
  1A) the center wing tank contains a usable level of fuel;
  1B) the aircraft is cruising in a pre-descent phase; and
  1C) the aircraft is in a descent phase; and opening at least a second isolation valve to distribute noncombustible gas to the left and right main wing tanks during flight each time one or more of the following conditions 2A-2D are met and closing the at least the second isolation valve to not distribute the noncombustible gas to the left and right main wing tanks during flight when none of the following conditions 2A-2D are met:
  2A) the aircraft is climbing;
  2B) the aircraft is cruising with the left and right main wing tanks' 02% projected to be above an inert limit before fuel decreases below a lower flammability limit;
  2C) the aircraft is cruising in the pre-descent phase; and
  2D) the aircraft is in the descent phase at an altitude below a selected altitude, distributing the noncombustible gas to the center wing tank throughout a continuous, first flight period because condition 1C is met and not distributing noncombustible gas to the left and right main wing tanks throughout the first flight period because none of conditions 2A-2D are met.

15. The method of claim 14 comprising not distributing the noncombustible gas to the center wing tank throughout a continuous, second flight period because none of conditions 1A-1C are met and distributing the noncombustible gas to the left and right main wing tanks throughout the second flight period because condition 2A or 2B is met.

16. A noncombustible gas distribution system comprising:
a noncombustible gas source on an aircraft;
a left main wing tank and a right main wing tank on opposite sides of the aircraft and a center wing tank between the left and right main wing tanks;
the left and right main wing tanks each having an inboard section and an outboard section each having baffle ribs and other ribs, the sections being defined by baffle ribs between the sections, the baffle ribs defining the sections having less ullage communication area between the sections compared to the ullage communication area of the other ribs within the sections;
noncombustible gas distribution tubing from the noncombustible gas source to the left and right main wing tanks and the center wing tank;
a first isolation valve in the noncombustible gas distribution tubing operable to isolate the center wing tank from receiving noncombustible gas;
at least one second isolation valve in the noncombustible gas distribution tubing operable to isolate the left and right main wing tanks from receiving noncombustible gas; and
a distribution mechanism including first noncombustible gas flow restrictions configured to balance noncombustible gas flow among the left and right main wing tanks and the center wing tank with first isolation valve and the at least one second isolation valve fully open to yield a greater proportion of noncombustible gas flow per tank unit volume distributed to the outboard section of the left and right main wing tanks compared to the inboard section during a climb phase of a flight of the aircraft.

17. The system of claim 16 wherein the distribution mechanism further comprises second noncombustible gas flow restrictions configured to balance noncombustible gas flow with the first isolation valve fully open to render the center wing tank non-flammable by a top of the climb phase.

18. The system of claim 16 wherein the first noncombustible gas flow restrictions comprise openings through noncombustible gas distribution tubing in the inboard and outboard sections of a selected size and/or number sufficient to yield the greater proportion of noncombustible gas flow per tank unit volume distributed to the outboard section of the left and right main wing tanks.

19. The system of claim 16 further comprising an isolation valve controller operationally linked to the first isolation valve and the at least one second isolation valve.

* * * * *